United States Patent
Steiner

(10) Patent No.: US 9,661,452 B2
(45) Date of Patent: May 23, 2017

(54) APPARATUS, SYSTEM AND METHOD OF ESTIMATING A LOCATION OF A MOBILE DEVICE

(71) Applicant: Intel Corporation, Santa Clara, CA (US)

(72) Inventor: Itai Steiner, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 111 days.

(21) Appl. No.: 14/134,956

(22) Filed: Dec. 19, 2013

(65) Prior Publication Data

US 2015/0181371 A1 Jun. 25, 2015

(51) Int. Cl.
*H04W 4/02* (2009.01)
*G01S 5/02* (2010.01)

(52) U.S. Cl.
CPC ............. *H04W 4/02* (2013.01); *G01S 5/0236* (2013.01)

(58) Field of Classification Search
CPC ....... H04W 4/02; H04W 4/021; H04W 4/025; H04W 88/02; H04W 12/08; H04W 12/06; H04W 8/18; H04W 48/04; G01C 21/00; H04L 29/08657; H04M 1/72572
USPC ............... 455/404.2, 410, 411, 414.1–414.3, 455/456.1–457, 550.1
See application file for complete search history.

(56) References Cited

U.S. PATENT DOCUMENTS

| | | | | |
|---|---|---|---|---|
| 8,116,787 B1* | 2/2012 | Lektuai | ........................ | 455/456.2 |
| 2009/0325595 A1* | 12/2009 | Farris | ........................ | 455/456.1 |
| 2009/0325606 A1* | 12/2009 | Farris | ........................ | 455/456.3 |
| 2010/0311438 A1* | 12/2010 | Edge | ........................ | H04W 4/02 455/456.1 |
| 2014/0135040 A1* | 5/2014 | Edge | ........................ | H04W 4/028 455/456.6 |
| 2014/0235280 A1* | 8/2014 | Edge | ........................ | H04W 48/16 455/456.6 |
| 2014/0266585 A1* | 9/2014 | Chao et al. | ........................ | 340/5.61 |
| 2015/0024782 A1* | 1/2015 | Edge | ........................ | 455/456.3 |
| 2015/0038173 A1* | 2/2015 | Jackson | ........................ | H04W 4/025 455/456.3 |

OTHER PUBLICATIONS

Open Mobile Alliance, LPP Extensions Specification, Version 1.0, Mar. 19, 2013, OMA-TS-LPPe-V1_0-20130319-C, 280 pages.

(Continued)

*Primary Examiner* — George Eng
*Assistant Examiner* — Umair Ahsan
(74) *Attorney, Agent, or Firm* — Shichrur & Co.

(57) ABSTRACT

Some demonstrative embodiments include apparatuses, systems and/or methods of estimating allocation of a mobile device. For example, an apparatus may include a location estimator to receive at a mobile device location assistance information from a server and to estimate a location of the mobile device using the location assistance information, the location estimator is to send to the server a request for mapping assistance information, the request including one or more parameters defining a geographical region, the location estimator is to receive from the server a response including the mapping assistance information according to the parameters, wherein the location estimator is to map the estimated location of the mobile device to the geographical region based on the mapping assistance information.

24 Claims, 4 Drawing Sheets

(56) References Cited

OTHER PUBLICATIONS

Open Mobile Alliance, User Plane Location Protocol, Version 2.1, Jan. 15, 2013, OMA-TS-ULP-V2_1-20130115-C, 379 pages.
Open Mobile Alliance, Secure User Plane Location Architecture, Version 2.0, Apr. 17, 2012, OMA-AD-SUPL-V2_0-20120417-A, 51 pages.
Open Mobile Alliance, Mobile Location Protocol 3.3, Version 3.3, Jul. 19, 2011, OMA-TS-MLP-V3_3-20110719-A, 137 pages.
Open Mobile Alliance, User Plane Location Protocol, Version 3.0, Sep. 20, 2011, OMA-TS-ULP-V3_0-20110920-C, 287 pages.
W3C, Geolocation API Specification, W3C Proposed Recommendation May 10, 2012, 18 pages.

* cited by examiner

APPARATUS, SYSTEM AND METHOD OF ESTIMATING A LOCATION OF A MOBILE DEVICE

TECHNICAL FIELD

Embodiments described herein generally relate to estimating a location of a mobile device.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites.

Location applications/services running on a mobile device may require an outdoor and/or an indoor map or GIS (Geographic Information System) data services for various uses. For example, a navigation application may require a road map to display a navigation route on the road map to a user of the navigation application.

The mobile device may store the map and/or the GIS data on a storage of the mobile device in a mapping database, e.g., an offline mapping database.

There may be need to constantly update the mapping database and more maps and/or GIS data may be added to the mapping database, for example, since the navigation application requires maps of different regions, e.g., when the user of the mobile device travels between different regions.

The storage of the mobile device may be limited. Therefore, the storage of the device may not have enough space and/or capacity to store the mapping database.

One solution is to configure the navigation application to utilize remote and/or online mapping service providers, e.g., third party map database vendors, to provide one or more maps and/or GIS data upon a request from the mobile device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
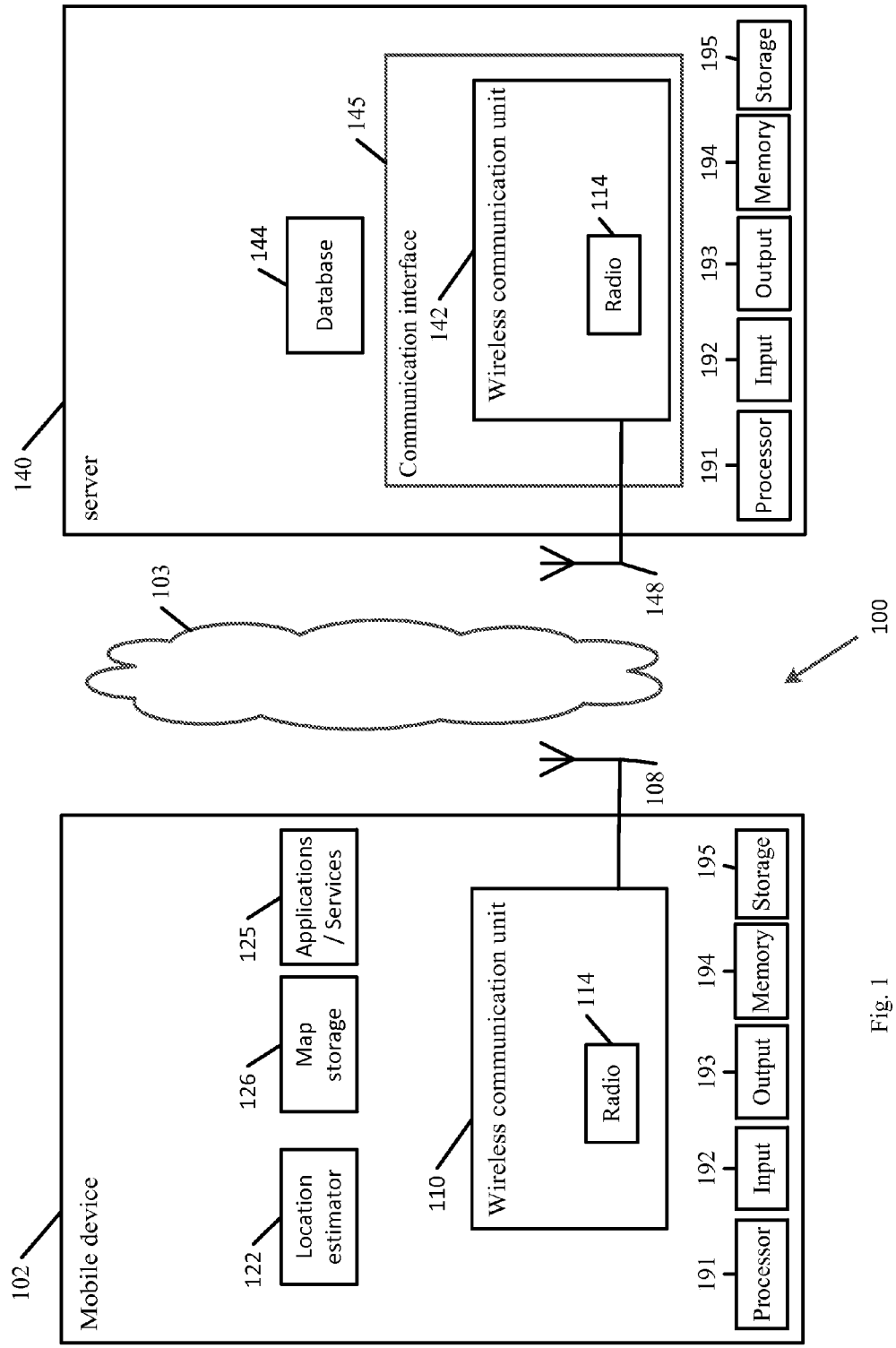
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, an Ultrabook™, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 *task group ac*

(TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 December, 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Open Mobile Alliance (OMA) standards, including the Secure User Plane Location (SUPL) protocol (SUPL-OMA-AD-SUPL-V2.0), the Mobile Location Protocol (MLP) (OMA-TS-MLP v 3.3, March 2009), the LTE Positioning Protocol (LPP) Extensions (OMA-TS-LPPe-V1_0-20130319-C), the User Plane Location Protocol (OMA-TS-ULP-V3_0-20110920-C) and/or future versions and/or derivatives thereof, devices and/or networks operating in accordance with existing In Location Alliance protocols and/or standards and/or future versions and/or derivatives thereof, devices and/or networks operating in accordance with existing World-Wide-Web Consortium (W3C) standards, including the W3C Hypertext Markup Language (HTML) Version 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include a mobile device 102 and a server 140.

In some demonstrative embodiments, wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, mobile device 102 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a video device, an audio device, an A/V device, a gaming device, a media player, a Smartphone, or the like.

In some demonstrative embodiments, device 102 and/or server 140 may include one or more wireless communication units to perform wireless communication between device 102, server 140 and/or one or more other wireless communication devices. For example, device 102 may include a wireless communication unit 110, and/or server 140 may include a wireless communication unit 142.

In some demonstrative embodiments, wireless communication unit 142 may be part of a communication interface 145 configured to enable server 140 to communicate with one or more devices.

In some demonstrative embodiments, communication interface 145 may support a wireless communication and/or a wired communication.

In one example, server 140 may be configured to communicate with device 102 wirelessly, e.g., via wireless communication unit 142 and WM 103.

In another example, server 140 may be configured to connect to device 102 via a combination of wired and wireless communication. For example, server 140 may be connected to the Internet via a cable and device 102 may be connected to the Internet via a wireless mediator, e.g., a cellular antenna, an AP and the like. Accordingly, server 140 and device 102 may be able to communicate, for example, using an Internet protocol, e.g., the TCP/IP protocol.

In some demonstrative embodiments, wireless communication units 110 and/or 142 may include one or more radios 114, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 110 and/or 142 may include or may be implemented as part of a wireless Network Interface Card (NIC), and the like.

In some demonstrative embodiments, the wireless communication units may include, or may be associated with, one or more antennas. For example, wireless communicate unit 110 may be associated with one or more antennas 108 and/or wireless communicate unit 142 may be associated with one or more antennas 148.

Antennas 108 and/or 148 may include any type of antennas suitable for transmitting and/or receiving wireless communication signals, blocks, frames, transmission streams, packets, messages and/or data. For example, antennas 108 and/or 148 may include any suitable configuration, structure and/or arrangement of one or more antenna elements, components, units, assemblies and/or arrays. Antennas 108 and/or 148 may include, for example, antennas suitable for directional communication, e.g., using beamforming techniques. For example, antennas 108 and/or 148 may include a phased array antenna, a multiple element antenna, a set of switched beam antennas, and/or the like. In some embodiments, antennas 108 and/or 148 may implement transmit and receive functionalities using separate transmit and receive antenna elements. In some embodiments, antennas 108 and/or 148 may implement transmit and receive functionalities using common and/or integrated transmit/receive elements.

In some demonstrative embodiments, mobile device 102 and/or server 140 may also include, for example, a processor 191, an input unit 192, an output unit 193, a memory unit 194, and a storage unit 195. Mobile device 102 and/or server 140 may optionally include other suitable hardware components and/or software components. In some demonstrative embodiments, some or all of the components of mobile device 102 and/or server 140 may be enclosed in a common housing or packaging, and may be interconnected or operably associated using one or more wired or wireless links. In other embodiments, components of mobile device 102 may be distributed among multiple or separate devices.

Processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 102 and/or of one or more suitable applications.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, mobile device 102 may be located in an indoor location, for example, a mall, a building, an office and/or the like. In other embodiments, mobile device 102 may be located in any other location, e.g., an indoor and/or an outdoor location.

In some demonstrative embodiments, device 102 may include one or more location applications and/or services 125 configured to provide location information and/or location services for a user of device 102.

For example, applications 125 may include a road/terrain navigation application, configured to navigate the user on a road/terrain.

In another example, applications 125 may include an indoor navigation application, configured to navigate the user, for example, in a mall, a building, a parking lot and the like.

In some demonstrative embodiments, device 102 may be required to estimate a location of mobile device 102 at the indoor and/or the outdoor location. For example, applications 125 may require the estimated location of device 102 to provide the user of device 102 the location information and/or the location services.

In some demonstrative embodiments, device 102 may utilize location assistance information to estimate the location of device 102.

In some demonstrative embodiments, device 102 may utilize assisted global positioning system (A-GPS) information.

In one example, device 102 may estimate the location of device 102 utilizing one or more signals from one or more satellites of the global navigation satellites system (GNSS), e.g., using trilateration method, together with the A-GPS information, for example, to increase an accuracy of the location of device 102 and/or to reduce time requires for estimating the location of device 102.

In some demonstrative embodiments, the location assistance information may include, for example, orbital data, e.g., ephemeris, of the GNSS satellites, almanac data of the GNSS satellites, an accurate time, ionospheric conditions and other conditions affecting the signals, and/or any other information configured to improve the accuracy and/or the time for estimating the location of device 102.

In some demonstrative embodiments, server 140 may be configured to provide the location assistance information. For example, server 140 may include a location assistance information server, e.g., an A-GPS server and/or a service location protocol (SLP), configured to provide the location assistance information to device 102, e.g., via WM 103.

In some demonstrative embodiments, server 120 may include a database 144 configured to store the location assistance information. For example, database 144 may store the orbital data of the GNSS satellites, the almanac data, the accurate time, the ionospheric conditions, and/or any other information, which assist to estimate allocation of a device.

In some demonstrative embodiments, device 102 may receive the location assistance information from server 140 and use the location assistance information to estimate the location of device 102.

In some demonstrative embodiments, device 102 may require one or more indoor and/or an outdoor maps and/or GIS data of a region corresponding to the estimated location of device 102. For example, the estimated location of device 102 may be in a mall. For example, an indoor navigation application of the mall may require a map of the mall to display a route from the estimated location of device 102 in the mall to a store in the mall.

In some demonstrative embodiments, device 102 may include a map storage 126 to store the required maps of the region. For example, map storage 126 may store one or more maps of the mall.

In some demonstrative embodiments, map storage 126 may enable utilizing of the required maps by device 102 and/or applications 125. For example, map storage 126 may enable retrieving the required maps from storage 126 and utilizing and/or displaying the maps of the mall on a screen and/or a display of device 102.

In some embodiments, map storage 126 may be implemented as part of storage 195; in another embodiments, storage 126 may be implemented as a separate element of device 102, e.g., separate from storage 126.

In some demonstrative embodiments, device 102 may require a relatively large number of maps and/or relatively large maps, e.g., which include a great amount of data, for example, if device 102 is moving between a plurality of different regions, and each region has a different map.

In some demonstrative embodiments, storing the maps of the different regions in map storage 126 may not be feasible, for example, if storage 126 has a limited storage capacity.

In one example, a user of device 102 may travel between different regions. The road navigation application may require maps of the different regions to display a route on the maps of the different regions to the user of device 102. The maps of the different regions may have a great amount of capacity and storage 126 may not have enough capacity to store the maps of the different regions.

In some demonstrative embodiments, device 102 may not be required to store the maps of the different regions in storage 126.

In some demonstrative embodiments, device 102 may store in storage 126 only the required maps.

In some demonstrative embodiments, device 102 may be configured to receive the required maps from a remote server upon a request from device 102.

For example, storage 126 may store a first map of a first region, e.g., a region corresponding to a first location of device 102, once device 102 completes using the first map, e.g., upon moving from the first location to a second location, the first map may be deleted from storage 126, and device 102 may be able to receive a second map of a second region, e.g., a region corresponding to the second location of device 102, upon a request from the remote server to provide the second map.

In some demonstrative embodiments, device 102 may be required to run an advanced and/or a full-scale operating system (OS), e.g., an iOS OS, an Android OS, and/or a Windows OS, and to run one or more applications and or tasks, e.g., a browser, a JavaScript engine, map applications, authentication tasks and the like, to enable device 102 to receive the requested maps from the remote server, for example, if the remote server include a server of a map services provider, e.g., map vendors.

In some demonstrative embodiments, a resource-constrained device, e.g., a device having limited computing resources, limited power resources and/or limited hardware components may not be able to run the full-scale OS and the one or more applications and/or tasks.

In some demonstrative embodiments, device 102 may not be able to run the full-scale operating system and the one or more applications and or tasks, e.g., if device 102 includes an embedded device, which runs a real time operating system (RTOS).

Accordingly, device 102 may not be able to receive the requested maps from the remote server, for example, if the remote server includes a server of a map services provider, e.g., map vendors.

Some demonstrative embodiments may enable assisted location information protocols to provide the requested maps to device 102, e.g., as described below.

Some demonstrative embodiments may enable device 102 to receive the requested maps from a location assistance information server, e.g., as described below.

In some demonstrative embodiments, server 140 may be configured to provide mapping assistance information to one or more devices. For example, server 140 may be configured to provide mapping assistance information to device 102.

In some demonstrative embodiments, server 140 may store in database 144 mapping assistance information of one or more geographical regions. For example, server 140 may store in database 144 maps of one or more countries, one or more cities, one or more public buildings and/or malls, one or more terrains and/or any other geographical information system (GIS) data.

In some demonstrative embodiments, device 102 may include a location estimator 122 to receive the location assistance information from server 140 and to estimate a location of device 102 using the location assistance information. For example, location estimator 122 may receive orbital data of GNSS satellites and accurate time from server 140 and may use the orbital data and the accurate time to estimate the location of device 102.

In some demonstrative embodiments, location estimator 122 may be configured to receive the mapping assistance information from server 140.

In some demonstrative embodiments, location estimator 122 may be configured to receive the mapping assistance information from server 140 via a communication link established between server 140 and device 102, e.g., over WM 103.

In some demonstrative embodiments, location estimator 122 may be configured to utilize the same communication link between server 140 and device 102 to receive the location assistance information as well as the mapping assistance information from server 140.

In some demonstrative embodiments, location estimator 122 may send to server 140 a request for mapping assistance information.

In some demonstrative embodiments, the request for mapping assistance information may include one or more parameters defining a geographical region.

In some demonstrative embodiments, the geographical region may include an indoor location. In other embodiments, the geographical region may include an outdoor location.

In some demonstrative embodiments, the geographical region may include the estimated location of device 102. In other embodiments, the geographical region may include a requested location, e.g., a location requested by a user of device 102.

In some demonstrative embodiments, the mapping assistance information may include a mapping tile of the geographical region. In one example, the mapping assistance information may include a mapping tile of the estimated location of device 102. In another example, the mapping assistance information may include a mapping tile of the requested-location.

In some demonstrative embodiments, the mapping assistance information may include a mapping tile of an indoor public building, a mapping tile of a terrain and/or any other type of mapping tiles.

In some demonstrative embodiments, the mapping assistance information may include GIS data. For example, the mapping assistance information may include one or more business and/or stores in the geographical region and/or any other geographical data of the region.

In some demonstrative embodiments, the one or more parameters may include the estimated location of device 102, which may be determined by location estimator 122 using the location assistance information from server 140, e.g., as described above.

In some demonstrative embodiments, the one or more parameters may include coordinates of the requested location, an address of the requested location, a street name, a city, a state, a country, a building name, a semantic location, e.g., a business name, a point of interest, and the like, a photo of the requested location, a video of the requested location, and/or any other parameter defining a requested location.

In some demonstrative embodiments, server 140 may receive the request for mapping assistance information from device 102, e.g., via communication interface 145.

In some demonstrative embodiments, server 140 may retrieve the mapping assistance information from database 144 based on the one or more parameters in the request for mapping assistance information.

In one example, server 140 may retrieve a map of a building from database 144, for example, if the one or more parameters include the building name and/or the estimated location of device 102 is at the building.

In another example, server 140 may retrieve a map of a street from database 144, for example, if the one or more parameters include the street name and/or the estimated location of device 102 is at the street.

In some demonstrative embodiments, server 140 may send a response to device 102, in response to the request for mapping assistance information, e.g., via communication interface 145.

In some demonstrative embodiments, the response may include the mapping assistance information according to the one or more parameters, e.g., as described above.

In some demonstrative embodiments, device 102 may receive from server 140 the response including the mapping assistance information, e.g., via wireless communication unit 110.

In some demonstrative embodiments, location estimator 122 may map the estimated location of device 102 to the geographical region based on the mapping assistance information.

In one example, location estimator 122 may map the estimated location of device 102 to a location in a building, e.g., a room in the building, for example, if the mapping assistance information includes a map of rooms of the building.

In another example, location estimator 122 may map the estimated location of device 102 to a location in a street, e.g., a block of the street, for example, if the mapping assistance information includes a map of the street.

In some demonstrative embodiments, location estimator 122 may correct the estimated location of device 102 based on the mapping assistance information. For example, the user of device 102 may drive along a road in a street, and the mapping assistance information may include a map tile of the street. Location estimator 122 may map the estimated location of device 102 to a building at the street, which may be, for example, twenty meters from the road. Accordingly, location estimator may correct the estimated location to be on the road based on the mapping assistance information and the information that the user of device 102 is driving along the road.

In some demonstrative embodiments, location estimator 122 may receive the mapping assistance information from server 140 based on user-credentials of the user of device 102.

In some demonstrative embodiments, the user-credentials may include a cellular identifier of a cellular mobile device, a secure user plane location (SUPL) user identifier, and/or any other user identifier.

In some demonstrative embodiments, the mapping assistance information may include restricted mapping information of a restricted region.

In some demonstrative embodiments, the restricted mapping information may be based on the user-credentials of the user of device 102.

In one example, the mapping assistance information may include a map of a private restricted building, e.g., of a private enterprise. Server 140 may provide the mapping assistance information only to users, which are associated with the enterprise, e.g., employees of the enterprise, based on user-credentials of the users, e.g., cellular identifiers of cellular mobile devices of the employees, e.g., a cellular identifier of device 102.

In some demonstrative embodiments, location estimator 122 may establish a secure session with server 140.

In some demonstrative embodiments, location estimator 122 may exchange with server 140 the request for mapping assistance information and the response during the secure session.

In some demonstrative embodiments, location estimator 122 may communicate the request for mapping assistance information and the response with server 140 according to an A-GPS protocol, e.g., as described below.

In some demonstrative embodiments, location estimator 122 may communicate the request for mapping assistance information and the response with server 140 according to a Secure User Plane Location (SUPL) protocol.

In one example, the request for location assistance information according to the SUPL protocol may include a mapping assistance type field including the request for mapping assistance information, e.g., as follows:

| Requested Assistance Data message | | |
|---|---|---|
| Parameter | Presence | Value/Description |
| Requested assistance data | — | This parameter is applicable for A-GPS positioning methods. It describes the requested A-GPS assistance data in form of a bitmap: |

| Requested Assistance Data message | | |
|---|---|---|
| Parameter | Presence | Value/Description |
| | | Almanac indicator<br>UTC model<br>Ionospheric model<br>DGPS corrections<br>Reference location<br>Reference time<br>Acquisition assistance<br>Real-time integrity<br>Navigation model<br>Mapping assistance type<br>NOTE: Reference location Bit is used for requesting Reference Location also for GANSS. |
| Navigation Model | CV | When the navigation model indicator is set, this field is present. |
| >GPS week | M | Contains the GPS week of the assistance data currently held in the SET; range is 0 to 1023 |
| >GPS Toe | M | Contains the GPS time of Ephemeris in hours of the newest set of Ephemeris contained in the SET; range is 0 to 167 |

In some demonstrative embodiments, the mapping assistance type field may include the one or more parameters defining the geographical region, e.g., the estimated location of device 102, the requested location, the address, the photo of the location, the video of the location, and/or the like.

In some demonstrative embodiments, location estimator 122 may communicate the request for mapping assistance information and the response with server 140 according to a Long Term Evolution (LTE) Positioning Protocol (LPP) or an LPP extension (LPPe) protocol.

In some demonstrative embodiments, location estimator 122 may include the request for mapping assistance information in a field of an LPPe-RequestAssistanceData message of the LTE LPPe or LPPe protocols.

In some demonstrative embodiments, the field of the LPPe-RequestAssistanceData message may include an "OMA-LPPe-MAP-RequestAssistanceData" information element.

For example, the LPPe-RequestAssistanceData message may include the following message:

| LPPe-RequestAssistanceData message |
|---|

```
-- ASN1START
OMA-LPPe-RequestAssistanceData ::= SEQUENCE {
commonIEsRequestAssistanceData  OMA-LPPe-CommonIEsRequestAssistanceData OPTIONAL,
agnss-RequestAssistanceData     OMA-LPPe-AGNSS-RequestAssistanceData OPTIONAL,
otdoa-RequestAssistanceData     OMA-LPPe-OTDOA-RequestAssistanceData OPTIONAL,
eotd-RequestAssistanceData      OMA-LPPe-EOTD-RequestAssistanceData OPTIONAL,
otdoa-utra-RequestAssistanceData OMA-LPPe-OTDOA-UTRA-RequestAssistanceData OPTIONAL
ecid-lte-RequestAssistanceData  OMA-LPPe-ECID-LTE-RequestAssistanceData OPTIONAL,
ecid-gsm-RequestAssistanceData  OMA-LPPe-ECID-GSM-RequestAssistanceData OPTIONAL,
ecid-utra-RequestAssistanceData OMA-LPPe-ECID-UTRA-RequestAssistanceData OPTIONAL,
wlan-ap-RequestAssistanceData   OMA-LPPe-WLAN-AP-RequestAssistanceData OPTIONAL,
sensor-RequestAssistanceData    OMA-LPPe-Sensor-RequestAssistanceData OPTIONAL,
srn-RequestAssistanceData       OMA-LPPe-SRN-RequestAssistanceData OPTIONAL,
MAP-RequestAssistanceData       OMA-LPPe-MAP-RequestAssistanceData
...
}
\
```

In some demonstrative embodiments, the OMA-LPPe-MAP-RequestAssistanceData information element may include the one or more parameters defining the geographical region.

For example, the OMA-LPPe-MAP-RequestAssistanceData information element may include an OMA-LPPe-MAP-RequestType information element including the type of the one or more parameters. For example, the OMA-LPPe-MAP-RequestType information element may include an indication that the parameters defining the geographic region indicate the estimated location of device 102, the requested location, the address, the photo of the location, the video of the location, and/or the like.

In some demonstrative embodiments, the OMA-LPPe-MAP-RequestAssistanceData information element may include one or more attributes of a parameter of the one or more parameters defining the geographical region.

For example, the OMA-LPPe-MAP-RequestAssistanceData information element may include an OMA-LPPe-MAP-LocationDataLCI information element including the one or more attributes of parameters defining the geographical region. For example, the information element including the type of the one or more parameters. For example, The OMA-LPPe-MAP-LocationDataLCI may include, for example, coordinates of the estimated location, for example, longitude and/or latitude coordinates, e.g., as follows:

OMA-LPPe-MAP-RequestAssistanceData information element

```
-- ASN1START
OMA-LPPe-MAP-RequestAssistanceData ::=            SEQUENCE {
    requestType                OMA-LPPe-MAP-RequestType,
    requestMapCenterLocation OMA-LPPe-MAP-LocationDataLCI    OPTIONAL,
    requestMapSize INTEGER(0..10000000)                      OPTIONAL,
    requestPhoto OPTIONAL,
    tVideo OPTIONAL,
    ...
}
OMA-LPPe-MAP-RequestType ::= SEQUENCE {
    SELF_LOCATION
    REQUESTED_LOCATION
    CIVIC_ADDRESS
    OUTDOOR
    INDOOR
    VENUE_NAME (STRING)
    PHOTO
    VIDEO
}
OMA-LPPe-MAP-LocationDataLCI ::= SEQUENCE {
       latitudeResolution               BIT STRING (SIZE (6)),
       latitude                         BIT STRING (SIZE (34)),
       longitudeResolution              BIT STRING (SIZE (6)),
       longitude          BIT STRING (SIZE (34)),
       altitudeType                     BIT STRING (SIZE (4)),
       altitudeResolution               BIT STRING (SIZE (6)),
       altitude           BIT STRING (SIZE (30)),
       datum                            BIT STRING (SIZE (8)),
       ...
}
-- ASN1STOP
```

In some demonstrative embodiments, server 140 may include the response in a field of an LPPe-ProvideAssistanceData message of the LTE LPPe or LPPe protocols.

In some demonstrative embodiments, the field of the LPPe-ProvideAssistanceData message may include an "OMA-LPPe-MAP-ProvideAssistanceData" information element.

In some demonstrative embodiments, device 102 may receive the LPPe-ProvideAssistanceData message from device 140.

In some demonstrative embodiments, the LPPe-ProvidetAssistanceData message may include the following message:

LPPe-ProvidetAssistanceData message

```
-- ASN1START
OMA-LPPe-ProvideAssistanceData ::= SEQUENCE {
commonIEsProvideAssistanceData  OMA-LPPe-CommonIEsProvideAssistanceData OPTIONAL,
agnss-ProvideAssistanceData     OMA-LPPe-AGNSS-ProvideAssistanceData OPTIONAL,
otdoa-ProvideAssistanceData     OMA-LPPe-OTDOA-ProvideAssistanceData OPTIONAL,
eotd-ProvideAssistanceData      OMA-LPPe-EOTD-ProvideAssistanceData OPTIONAL,
otdoa-utra-ProvideAssistanceData  OMA-LPPe-OTDOA-UTRA-ProvideAssistanceData OPTIONAL,
ecid-lte-ProvideAssistanceData  OMA-LPPe-ECID-LTE-ProvideAssistanceData OPTIONAL,
```

-continued

| LPPe-ProvidetAssistanceData message | |
|---|---|
| ecid-gsm-ProvideAssistanceData | OMA-LPPe-ECID-GSM-ProvideAssistanceData OPTIONAL, |
| ecid-utra-ProvideAssistanceData | OMA-LPPe-ECID-UTRA-ProvideAssistanceData OPTIONAL, |
| wlan-ap-ProvideAssistanceData | OMA-LPPe-WLAN-AP-ProvideAssistanceData OPTIONAL, |
| sensor-ProvideAssistanceData | OMA-LPPe-Sensor-ProvideAssistanceData OPTIONAL, |
| srn-ProvideAssistanceData | OMA-LPPe-SRN-ProvideAssistanceData OPTIONAL, |
| MAP-ProvideAssistanceData | OMA-LPPe-MAP-ProvideAssistanceData |

...
}
-- ASN1STOP

In some demonstrative embodiments, the OMA-LPPe-MAP-ProvideAssistanceData information element may include the mapping assistance information including the map tile and one or more attributes of the map tile, for example, map size, map format and/or any other attributes relating to the map tile, e.g., as follows:

| OMA-LPPe-MAP-ProvideAssistanceData information element | |
|---|---|
| -- ASN1START | |
| OMA-LPPe-MAP-ProvideAssistanceData ::= SEQUENCE { | |
| mapElement | OMA-LPPe-MAP-MapElement, |
| ... | |
| } | |
| OMA-LPPe-MAP-MapElement ::= SEQUENCE { | |
| mapFormatType | |
| map Size | |
| mapContainer | OPTIONAL |
| mapUrl | OPTIONAL |
| mapUrlAuthToken | OPTIONAL |
| } | |
| -- ASN1STOP | |

In some demonstrative embodiments, receiving the mapping assistance information from server 140 may enable receiving the mapping assistance information by device 102, for example, even if device 102 is a resource-constrained device running RTOS, e.g., since only a basic secure stack is required.

In some demonstrative embodiments, receiving the mapping assistance information from server 140 may enable authentication of the user of device 102 in a relatively simple way, e.g., utilizing cellular identifiers of the user of device 102.

In some demonstrative embodiments, receiving the mapping assistance information from server 140 may enable an operator of server 140, e.g., a cellular network operator, to control mapping services and/or licensing to users, e.g., utilizing the restricted mapping information based on the user-credentials.

In some demonstrative embodiments, receiving the mapping assistance information from server 140 may enable the operator of server 140 to bill the user of device 102 per use of the mapping assistance information, e.g., utilizing the user-credentials.

In some demonstrative embodiments, receiving the mapping assistance information from server 140 may reduce outgoing traffic from server 140. For example, server 140 may store frequently used maps and/or databases, e.g., performing the functionality of a proxy.

In some demonstrative embodiments, receiving the mapping assistance information from server 140 may enable using a common link to communicate both the location assistance information and the mapping assistance information from server 140 to device 102, for example, instead of using a dedicated application, interface, and/or channel to communicate with a dedicated map provider.

Figure 2:
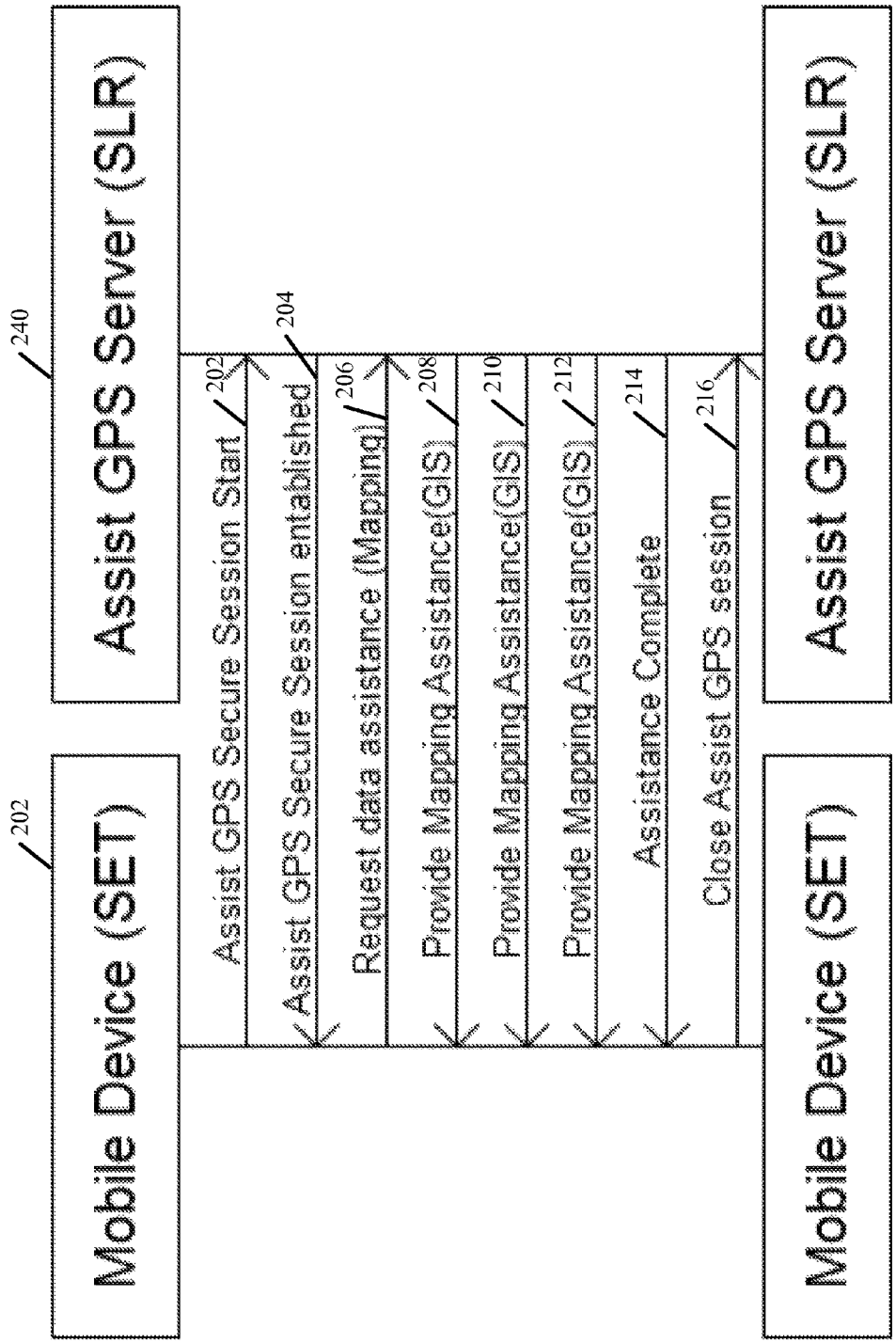
FIG. 2 is a schematic sequence diagram of operations and interactions between a mobile device and a server, in accordance with some demonstrative embodiments.

Reference is made to FIG. 2, which schematically illustrates a sequence diagram, which demonstrates operations and interactions between a mobile device 200 and a location assistance information (Assist GPS) server 240, in accordance with some demonstrative embodiments. For example, mobile device 200 may perform the functionality of mobile device 102 (FIG. 1) and/or server 240 may perform the functionality of server 140 (FIG. 1).

As shown in FIG. 2, mobile device 200 may send to server 240 a request 202 to establish a secure assist GPS session, for example, to receive location assistance information from the server. For example, device 102 (FIG. 1) may send a request to server 140 (FIG. 1) to establish the secure session, e.g., as described above.

As shown in FIG. 2, server 240 may send to device 200 a response 204 to confirm that the session is established. For example, server 140 (FIG. 1) may confirm to device 102 (FIG. 1) that the session is established.

As shown in FIG. 2, mobile device 200 may send to server 240 a request 206 for mapping assistance information. For example, device 102 (FIG. 1) may send the request for mapping assistance information to server 140 (FIG. 1) to establish the secure session, e.g., as described above.

As shown in FIG. 2, server 240 may send to device 200 one or more responses 208, 210 and/or 212 including the mapping assistance information, e.g., one or more map tiles and/or GIS data of a geographical region. For example, server 140 (FIG. 1) may send to device 102 (FIG. 1) the response including the mapping assistance information, e.g., as described above.

As shown in FIG. 2, server 240 may send to device 200 an assistance complete message 214, for example, once server 240 completes to transmit all the mapping assistance information associated with the geographical region.

As shown in FIG. 2, mobile device 200 may transmit to server 240 a message 216 to close the secure assist GPS session.

Figure 3:
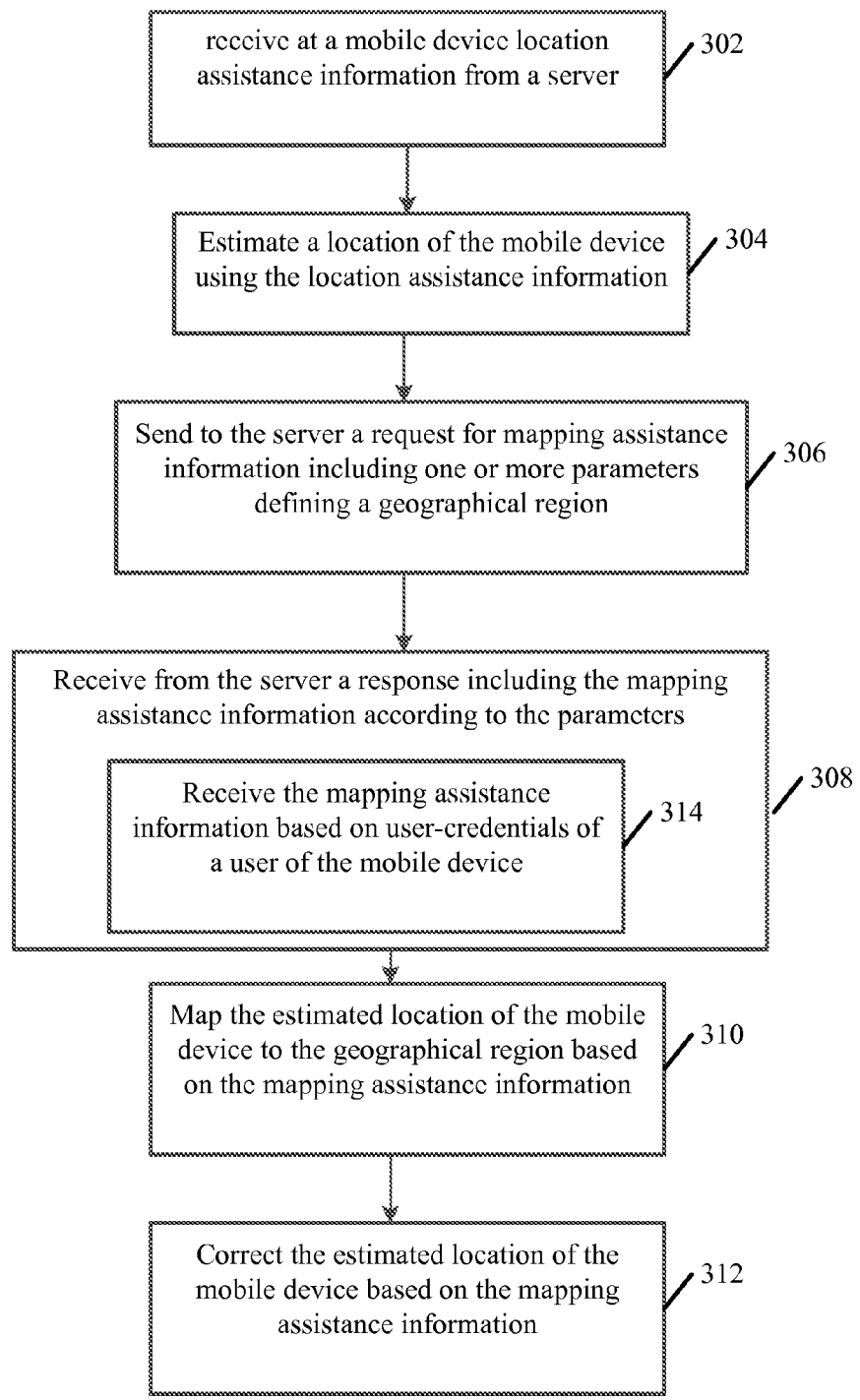
FIG. 3 is a schematic flow chart illustration of a method of estimating a location of a mobile device, in accordance with some demonstrative embodiments.

Reference is now made to FIG. 3, which schematically illustrates a method of estimating a location of a mobile device, in accordance with some demonstrative embodiments. For example, one or more of the operations of the method of FIG. 3 may be performed by a wireless communication system, e.g., system 100 (FIG. 1); a mobile device, e.g., device 102 (FIG. 1); a server, e.g., server 140 (FIG. 1), a wireless communication unit, e.g., wireless communication units 110 and/or 142 (FIG. 1) and/or a location estimator, e.g., location estimator 122 (FIG. 1).

As indicated at block 302, the method may include receiving at a mobile device location assistance information from a server. For example, location estimator 122 (FIG. 1)

may receive the location assistance information from server 140 (FIG. 1), e.g., as described above.

As indicated at block 304, the method may include estimating a location of the mobile device using the location assistance information. For example, location estimator 122 (FIG. 1) may estimate the location of device 102 (FIG. 1) based on the location assistance information, e.g., as described above.

As indicated at block 306, the method may include sending to the server a request for mapping assistance information including one or more parameters defining a geographical region. For example, location estimator 122 (FIG. 1) may send to server 140 (FIG. 1) the request for mapping assistance information including the one or more parameters defining the geographical region, e.g., as described above.

In some embodiments, the operation indicated at block 306 may be performed after the operations indicated at blocks 302 and/or 304, e.g., as shown in FIG. 3.

In other embodiments, the operation indicated at block 306 may be performed before the operations indicated at blocks 302 and/or 304. For example, location estimator 122 (FIG. 1) may send to server 140 (FIG. 1) the request for mapping assistance information before sending to server 140 (FIG. 1) the request for the location assistance information, e.g., using the estimated location of device 102 (FIG. 1), which was determined by the signals of the GNSS satellites.

As indicated at block 308, the method may include receiving from the server a response including the mapping assistance information according to the parameters. For example, location estimator 122 (FIG. 1) may receive from server 140 (FIG. 1) the response including the mapping assistance information according to the parameters, e.g., as described above.

As indicated at block 314, receiving from the server the response including the mapping assistance information may include receiving the mapping assistance information based on user-credentials of a user of the mobile device. For example, location estimator 122 (FIG. 1) may receive from server 140 (FIG. 1) the response including the mapping assistance information based on the user-credentials of the user of mobile device 102 (FIG. 1), e.g., as described above.

As indicated at block 310, the method may include mapping the estimated location of the mobile device to the geographical region based on the mapping assistance information. For example, location estimator 122 (FIG. 1) may map the estimated location of device 102 (FIG. 1) to the geographical region based on the mapping assistance information, e.g., as described above.

As indicated at block 312, the method may include correcting the estimated location of the mobile device based on the mapping assistance information. For example, location estimator 122 (FIG. 1) may correct the estimated location of device 102 (FIG. 1) based on the mapping assistance information, e.g., as described above.

Figure 4:
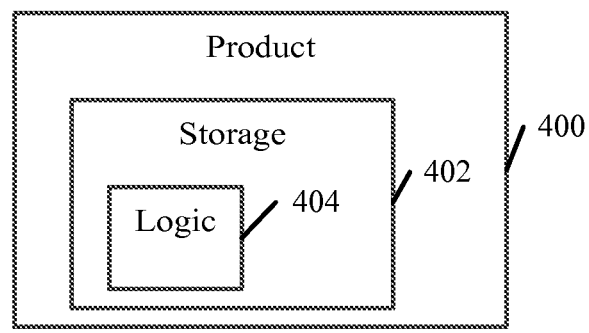
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), wireless communication unit 110 (FIG. 1), wireless communication unit 142 (FIG. 1), server 140 (FIG. 1), location estimator 122 (FIG. 1), and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a location estimator to receive at a mobile device location assistance information from a server and to estimate a location of the mobile device using the location assistance information, the location estimator is to send to the server a request for mapping assistance information, the request including one or more parameters defining a geographical region, the location estimator is to receive from the server a response including the mapping assistance information according to the parameters, wherein the location estimator is to map the estimated location of the mobile device to the geographical region based on the mapping assistance information.

Example 2 includes the subject matter of Example 1, and optionally, wherein the mapping assistance information comprises a mapping tile of the geographical region.

Example 3 includes the subject matter of Example 1 or 2, and optionally, wherein the geographical region includes an indoor region.

Example 4 includes the subject matter of any one of Examples 1-3, and optionally, wherein the location estimator is to communicate the request and response with the server according to an assisted global-positioning-system (GPS) protocol.

Example 5 includes the subject matter of any one of Examples 1-3, and optionally, wherein the location estimator is to communicate the request and response with the server according to a Long Term Evolution (LTE) Positioning Protocol (LPP) or an LPP extension (LPPe).

Example 6 includes the subject matter of Example 5, and optionally, wherein the location estimator is to include the request in a field of a LPPe-RequestAssistanceData message, and to receive the response in a field of a LPPe-RequestAssistanceData message.

Example 7 includes the subject matter of any one of Examples 1-3, and optionally, wherein the location estimator is to communicate the request and response with the server according to a Secure User Plane Location (SUPL) protocol.

Example 8 includes the subject matter of any one of Examples 1-3, and optionally, wherein the location estimator is to receive the mapping assistance information based on user-credentials of a user of the mobile device.

Example 9 includes the subject matter of Example 8, and optionally, wherein the user-credentials comprise an identifier selected from the group consisting of a cellular identifier of a cellular mobile device and a Secure User Plane Location (SUPL) based user identifier.

Example 10 includes the subject matter of Example 8, and optionally, wherein the mapping assistance information comprises restricted mapping information of a restricted region, and wherein the restricted mapping information is based on the user-credentials of a user of the mobile device.

Example 11 includes the subject matter of any one of Examples 1-10, and optionally, wherein the geographical region includes the estimated location of the mobile device.

Example 12 includes the subject matter of any one of Examples 1-11, and optionally, wherein the location estimator is to correct the estimated location of the mobile device based on the mapping assistance information.

Example 13 includes the subject matter of any one of Examples 1-12, and optionally, wherein the location estimator is to establish a secure session with the server and to exchange the request and response with the server during the secure session.

Example 14 includes a system comprising a server including a communication interface to communicate with a mobile device; and a database to store location assistance information and mapping information of one or more geographical regions, wherein the server is to send to the mobile device location assistance information based on a location of the mobile device, to receive from the mobile device a request for requested mapping assistance information, the request including one or more parameters defining a requested geographical region, and to send to the mobile device a response including the requested mapping assistance information according to the parameters.

Example 15 includes the subject matter of Example 14, and optionally, wherein the requested mapping assistance information comprises a mapping tile of the geographical region.

Example 16 includes the subject matter of Example 14 or 15, and optionally, wherein the geographical region includes an indoor region.

Example 17 includes the subject matter of any one of Examples 14-16, and optionally, wherein the server is to communicate the request and response with the mobile device according to an assisted global-positioning-system (GPS) protocol.

Example 18 includes the subject matter of any one of Examples 14-16, and optionally, wherein the server is to communicate the request and response with the mobile device according to a Long Term Evolution (LTE) Positioning Protocol (LPP) or an LPP extension (LPPe).

Example 19 includes the subject matter of Example 18, and optionally, wherein the server is to receive the request in a field of a LPPe-RequestAssistanceData message, and to send the response in a field of a LPPe-RequestAssistanceData message.

Example 20 includes the subject matter of any one of Examples 14-16, and optionally, wherein the server is to communicate the request and response with the mobile device according to a Secure User Plane Location (SUPL) protocol.

Example 21 includes the subject matter of any one of Examples 14-16, and optionally, wherein server is to send the mapping assistance information based on user-credentials of a user of the mobile device.

Example 22 includes the subject matter of Example 21, and optionally, wherein the user-credentials comprise an identifier selected from the group consisting of a cellular identifier of a cellular mobile device and a Secure User Plane Location (SUPL) based user identifier.

Example 23 includes the subject matter of Example 21, and optionally, wherein the mapping assistance information comprises restricted mapping information of a restricted region, and wherein the restricted mapping information is based on the user-credentials of a user of the mobile device.

Example 24 includes the subject matter of any one of Examples 14-23, and optionally, wherein the geographical region includes the estimated location of the mobile device.

Example 25 includes the subject matter of any one of Examples 14-24, and optionally, wherein the server is to establish a secure session with the mobile device and to exchange the request and response with the mobile device during the secure session.

Example 26 includes a mobile device comprising one or more antennas; a wireless communication unit to communicate via the antennas; and a location estimator to receive location assistance information from a server and to estimate a location of the mobile device using the location assistance information, the location estimator is to send to the server a request for mapping assistance information, the request including one or more parameters defining a geographical region, the location estimator is to receive from the server a response including the mapping assistance information according to the parameters, wherein the location estimator is to map the estimated location of the mobile device to the geographical region based on the mapping assistance information.

Example 27 includes the subject matter of Example 26, and optionally, wherein the mapping assistance information comprises a mapping tile of the geographical region.

Example 28 includes the subject matter of Example 26 or 27, and optionally, wherein the geographical region includes an indoor region.

Example 29 includes the subject matter of any one of Examples 26-28, and optionally, wherein the location estimator is to communicate the request and response with the server according to an assisted global-positioning-system (GPS) protocol.

Example 30 includes the subject matter of any one of Examples 26-28, and optionally, wherein the location estimator is to communicate the request and response with the server according to a Long Term Evolution (LTE) Positioning Protocol (LPP) or an LPP extension (LPPe).

Example 31 includes the subject matter of Example 30, and optionally, wherein the location estimator is to include the request in a field of a LPPe-RequestAssistanceData message, and to receive the response in a field of a LPPe-RequestAssistanceData message.

Example 32 includes the subject matter of any one of Examples 26-28, and optionally, wherein the location estimator is to communicate the request and response with the server according to a Secure User Plane Location (SUPL) protocol.

Example 33 includes the subject matter of any one of Examples 26-28, and optionally, wherein the location estimator is to receive the mapping assistance information based on user-credentials of a user of the mobile device.

Example 34 includes the subject matter of Example 33, and optionally, wherein the user-credentials comprise an identifier selected from the group consisting of a cellular identifier of a cellular mobile device and a Secure User Plane Location (SUPL) based user identifier.

Example 35 includes the subject matter of Example 33, and optionally, wherein the mapping assistance information comprises restricted mapping information of a restricted region, and wherein the restricted mapping information is based on the user-credentials of a user of the mobile device.

Example 36 includes the subject matter of any one of Examples 26-35, and optionally, wherein the geographical region includes the estimated location of the mobile device.

Example 37 includes the subject matter of any one of Examples 26-36, and optionally, wherein the location estimator is to correct the estimated location of the mobile device based on the mapping assistance information.

Example 38 includes the subject matter of any one of Examples 26-37, and optionally, wherein the location estimator is to establish a secure session with the server and to exchange the request and response with the server during the secure session.

Example 39 includes a method comprising receiving at a mobile device location assistance information from a server; estimating a location of the mobile device using the location assistance information; sending to the server a request for mapping assistance information, the request including one or more parameters defining a geographical region; receiving from the server a response including the mapping assistance information according to the parameters; and mapping the estimated location of the mobile device to the geographical region based on the mapping assistance information.

Example 40 includes the subject matter of Example 39, and optionally, wherein the mapping assistance information comprises a mapping tile of the geographical region.

Example 41 includes the subject matter of Example 39 or 40, and optionally, wherein the geographical region includes an indoor region.

Example 42 includes the subject matter of any one of Examples 39-41, and optionally, comprising communicating the request and response with the server according to an assisted global-positioning-system (GPS) protocol.

Example 43 includes the subject matter of any one of Examples 39-41, and optionally, comprising communicating the request and response with the server according to a Long Term Evolution (LTE) Positioning Protocol (LPP) or an LPP extension (LPPe).

Example 44 includes the subject matter of Example 43, and optionally, comprising including the request in a field of a LPPe-RequestAssistanceData message, and receiving the response in a field of a LPPe-RequestAssistanceData message.

Example 45 includes the subject matter of any one of Examples 39-41, and optionally, comprising communicating the request and response with the server according to a Secure User Plane Location (SUPL) protocol.

Example 46 includes the subject matter of any one of Examples 39-41, and optionally, comprising receiving the mapping assistance information based on user-credentials of a user of the mobile device.

Example 47 includes the subject matter of Example 46, and optionally, wherein the user-credentials comprise an identifier selected from the group consisting of a cellular identifier of a cellular mobile device and a Secure User Plane Location (SUPL) based user identifier.

Example 48 includes the subject matter of Example 46, and optionally, wherein the mapping assistance information comprises restricted mapping information of a restricted region, and wherein the restricted mapping information is based on the user-credentials of a user of the mobile device.

Example 49 includes the subject matter of any one of Examples 39-48, and optionally, wherein the geographical region includes the estimated location of the mobile device.

Example 50 includes the subject matter of any one of Examples 39-49, and optionally, comprising correcting the estimated location of the mobile device based on the mapping assistance information.

Example 51 includes the subject matter of any one of Examples 39-50, and optionally, comprising establishing a secure session with the server and exchanging the request and response with the server during the secure session.

Example 52 includes a method comprising storing location assistance information and mapping information of one or more geographical regions; send to a mobile device location assistance information based on a location of the mobile device; receiving from the mobile device a request for requested mapping assistance information, the request including one or more parameters defining a requested geographical region; and sending to the mobile device a response including the requested mapping assistance information according to the parameters.

Example 53 includes the subject matter of Example 52, and optionally, wherein the requested mapping assistance information comprises a mapping tile of the geographical region.

Example 54 includes the subject matter of Example 52 or 53, and optionally, wherein the geographical region includes an indoor region.

Example 55 includes the subject matter of any one of Examples 52-54, and optionally, comprising communicating the request and response with the mobile device according to an assisted global-positioning-method (GPS) protocol.

Example 56 includes the subject matter of any one of Examples 52-54, and optionally, comprising communicating the request and response with the mobile device according to a Long Term Evolution (LTE) Positioning Protocol (LPP) or an LPP extension (LPPe).

Example 57 includes the subject matter of Example 56, and optionally, comprising receiving the request in a field of a LPPe-RequestAssistanceData message, and sending the response in a field of a LPPe-RequestAssistanceData message.

Example 58 includes the subject matter of any one of Examples 52-54, and optionally, comprising communicating the request and response with the mobile device according to a Secure User Plane Location (SUPL) protocol.

Example 59 includes the subject matter of any one of Examples 52-54, and optionally, comprising sending the mapping assistance information based on user-credentials of a user of the mobile device.

Example 60 includes the subject matter of Example 59, and optionally, wherein the user-credentials comprise an identifier selected from the group consisting of a cellular identifier of a cellular mobile device and a Secure User Plane Location (SUPL) based user identifier.

Example 61 includes the subject matter of Example 59, and optionally, wherein the mapping assistance information comprises restricted mapping information of a restricted region, and wherein the restricted mapping information is based on the user-credentials of a user of the mobile device.

Example 62 includes the subject matter of any one of Examples 52-61, and optionally, wherein the geographical region includes the estimated location of the mobile device.

Example 63 includes the subject matter of any one of Examples 52-62, and optionally, comprising establishing a secure session with the mobile device, and exchanging the request and response with the mobile device during the secure session.

Example 64 includes a product including a non-transitory storage medium having stored thereon instructions that, when executed by a machine, result in receiving at a mobile device location assistance information from a server; estimating a location of the mobile device using the location assistance information; sending to the server a request for mapping assistance information, the request including one or more parameters defining a geographical region; receiving from the server a response including the mapping assistance information according to the parameters; and mapping the estimated location of the mobile device to the geographical region based on the mapping assistance information.

Example 65 includes the subject matter of Example 64, and optionally, wherein the mapping assistance information comprises a mapping tile of the geographical region.

Example 66 includes the subject matter of Example 64 or 65, and optionally, wherein the geographical region includes an indoor region.

Example 67 includes the subject matter of any one of Examples 64-66, and optionally, wherein the instructions result in communicating the request and response with the server according to an assisted global-positioning-system (GPS) protocol.

Example 68 includes the subject matter of any one of Examples 64-66, and optionally, wherein the instructions result in communicating the request and response with the server according to a Long Term Evolution (LTE) Positioning Protocol (LPP) or an LPP extension (LPPe).

Example 69 includes the subject matter of Example 68, and optionally, wherein the instructions result in including the request in a field of a LPPe-RequestAssistanceData message, and receiving the response in a field of a LPPe-RequestAssistanceData message.

Example 70 includes the subject matter of any one of Examples 64-66, and optionally, wherein the instructions result in communicating the request and response with the server according to a Secure User Plane Location (SUPL) protocol.

Example 71 includes the subject matter of any one of Examples 64-66, and optionally, wherein the instructions result in receiving the mapping assistance information based on user-credentials of a user of the mobile device.

Example 72 includes the subject matter of Example 71, and optionally, wherein the user-credentials comprise an identifier selected from the group consisting of a cellular identifier of a cellular mobile device and a Secure User Plane Location (SUPL) based user identifier.

Example 73 includes the subject matter of Example 71, and optionally, wherein the mapping assistance information comprises restricted mapping information of a restricted region, and wherein the restricted mapping information is based on the user-credentials of a user of the mobile device.

Example 74 includes the subject matter of any one of Examples 64-73, and optionally, wherein the geographical region includes the estimated location of the mobile device.

Example 75 includes the subject matter of any one of Examples 64-74, and optionally, wherein the instructions result in correcting the estimated location of the mobile device based on the mapping assistance information.

Example 76 includes the subject matter of any one of Examples 64-74, and optionally, wherein the instructions result in establishing a secure session with the server and exchanging the request and response with the server during the secure session.

Example 77 includes a product including a non-transitory storage medium having stored thereon instructions that, when executed by a machine, result in storing location assistance information and mapping information of one or more geographical regions; send to a mobile device location assistance information based on a location of the mobile device; receiving from the mobile device a request for requested mapping assistance information, the request including one or more parameters defining a requested geographical region; and sending to the mobile device a response including the requested mapping assistance information according to the parameters.

Example 78 includes the subject matter of Example 77, and optionally, wherein the requested mapping assistance information comprises a mapping tile of the geographical region.

Example 79 includes the subject matter of Example 77 or 78, and optionally, wherein the geographical region includes an indoor region.

Example 80 includes the subject matter of any one of Examples 77-79, and optionally, wherein the instructions result in communicating the request and response with the mobile device according to an assisted global-positioning-product (GPS) protocol.

Example 81 includes the subject matter of any one of Examples 77-79, and optionally, wherein the instructions result in communicating the request and response with the mobile device according to a Long Term Evolution (LTE) Positioning Protocol (LPP) or an LPP extension (LPPe).

Example 82 includes the subject matter of Example 81, and optionally, wherein the instructions result in receiving the request in a field of a LPPe-RequestAssistanceData message, and sending the response in a field of a LPPe-RequestAssistanceData message.

Example 83 includes the subject matter of any one of Examples 77-79, and optionally, wherein the instructions result in communicating the request and response with the mobile device according to a Secure User Plane Location (SUPL) protocol.

Example 84 includes the subject matter of any one of Examples 77-79, and optionally, wherein the instructions result in sending the mapping assistance information based on user-credentials of a user of the mobile device.

Example 85 includes the subject matter of Example 84, and optionally, wherein the user-credentials comprise an identifier selected from the group consisting of a cellular identifier of a cellular mobile device and a Secure User Plane Location (SUPL) based user identifier.

Example 86 includes the subject matter of Example 84, and optionally, wherein the mapping assistance information comprises restricted mapping information of a restricted region, and wherein the restricted mapping information is based on the user-credentials of a user of the mobile device.

Example 87 includes the subject matter of any one of Examples 77-86, and optionally, wherein the geographical region includes the estimated location of the mobile device.

Example 88 includes the subject matter of any one of Examples 77-87, and optionally, wherein the instructions result in establishing a secure session with the mobile device, and exchanging the request and response with the mobile device during the secure session.

Example 89 includes an apparatus comprising means for receiving at a mobile device location assistance information from a server; means for estimating a location of the mobile device using the location assistance information; means for sending to the server a request for mapping assistance information, the request including one or more parameters defining a geographical region; means for receiving from the server a response including the mapping assistance information according to the parameters; and means for mapping the estimated location of the mobile device to the geographical region based on the mapping assistance information.

Example 90 includes the subject matter of Example 89, and optionally, wherein the mapping assistance information comprises a mapping tile of the geographical region.

Example 91 includes the subject matter of Example 89 or 90, and optionally, wherein the geographical region includes an indoor region.

Example 92 includes the subject matter of any one of Examples 89-91, and optionally, comprising means for communicating the request and response with the server according to an assisted global-positioning-system (GPS) protocol.

Example 93 includes the subject matter of any one of Examples 89-91, and optionally, comprising means for communicating the request and response with the server according to a Long Term Evolution (LTE) Positioning Protocol (LPP) or an LPP extension (LPPe).

Example 94 includes the subject matter of Example 93, and optionally, comprising means for including the request in a field of a LPPe-RequestAssistanceData message, and receiving the response in a field of a LPPe-RequestAssistanceData message.

Example 95 includes the subject matter of any one of Examples 89-91, and optionally, comprising means for communicating the request and response with the server according to a Secure User Plane Location (SUPL) protocol.

Example 96 includes the subject matter of any one of Examples 89-91, and optionally, comprising means for receiving the mapping assistance information based on user-credentials of a user of the mobile device.

Example 97 includes the subject matter of Example 96, and optionally, wherein the user-credentials comprise an identifier selected from the group consisting of a cellular identifier of a cellular mobile device and a Secure User Plane Location (SUPL) based user identifier.

Example 98 includes the subject matter of Example 96, and optionally, wherein the mapping assistance information comprises restricted mapping information of a restricted region, and wherein the restricted mapping information is based on the user-credentials of a user of the mobile device.

Example 99 includes the subject matter of any one of Examples 89-98, and optionally, wherein the geographical region includes the estimated location of the mobile device.

Example 100 includes the subject matter of any one of Examples 89-99, and optionally, comprising means for correcting the estimated location of the mobile device based on the mapping assistance information.

Example 101 includes the subject matter of any one of Examples 89-100, and optionally, comprising means for establishing a secure session with the server and exchanging the request and response with the server during the secure session.

Example 102 includes an apparatus comprising means for storing location assistance information and mapping information of one or more geographical regions; means for send to a mobile device location assistance information based on a location of the mobile device; means for receiving from the mobile device a request for requested mapping assistance information, the request including one or more parameters defining a requested geographical region; and means for sending to the mobile device a response including the requested mapping assistance information according to the parameters.

Example 103 includes the subject matter of Example 102, and optionally, wherein the requested mapping assistance information comprises a mapping tile of the geographical region.

Example 104 includes the subject matter of Example 102 or 103, and optionally, wherein the geographical region includes an indoor region.

Example 105 includes the subject matter of any one of Examples 102-104, and optionally, comprising means for communicating the request and response with the mobile device according to an assisted global-positioning-apparatus (GPS) protocol.

Example 106 includes the subject matter of any one of Examples 102-104, and optionally, comprising means for communicating the request and response with the mobile device according to a Long Term Evolution (LTE) Positioning Protocol (LPP) or an LPP extension (LPPe).

Example 107 includes the subject matter of Example 106, and optionally, comprising means for receiving the request in a field of a LPPe-RequestAssistanceData message, and sending the response in a field of a LPPe-RequestAssistanceData message.

Example 108 includes the subject matter of any one of Examples 102-104, and optionally, comprising means for communicating the request and response with the mobile device according to a Secure User Plane Location (SUPL) protocol.

Example 109 includes the subject matter of any one of Examples 102-104, and optionally, comprising means for sending the mapping assistance information based on user-credentials of a user of the mobile device.

Example 110 includes the subject matter of Example 109, and optionally, wherein the user-credentials comprise an identifier selected from the group consisting of a cellular identifier of a cellular mobile device and a Secure User Plane Location (SUPL) based user identifier.

Example 111 includes the subject matter of Example 109, and optionally, wherein the mapping assistance information comprises restricted mapping information of a restricted region, and wherein the restricted mapping information is based on the user-credentials of a user of the mobile device.

Example 112 includes the subject matter of any one of Examples 102-111, and optionally, wherein the geographical region includes the estimated location of the mobile device.

Example 113 includes the subject matter of any one of Examples 102-112, and optionally, comprising means for establishing a secure session with the mobile device, and exchanging the request and response with the mobile device during the secure session.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a radio to communicate at a mobile device with a server via a communication link; and
   a location estimator to send via the communication link a request to the server to establish a secure assistance session for reception of location assistance information from the server, the location estimator to receive via the communication link the location assistance information from said server and to determine an estimated location of said mobile device using the location assistance information, said location estimator is to send to said server via the communication link a request for mapping assistance information during the secure assistance session, the request for mapping assistance information including one or more parameters defining a geographical region based on said estimated location, and one or more fields defining one or more attributes of the mapping assistance information, the one or more attributes including at least a type of the mapping information, wherein, during the secure assistance session, said location estimator is to receive from said server via the communication link a response including the mapping assistance information according to said one or more parameters and according to the one or more attributes, wherein said location estimator is to map the estimated location of the mobile device to the geographical region based on the mapping assistance information, said location estimator is to, based on the mapping, assistance information, correct the estimated location of the mobile device, which is determined based on the location assistance information.

2. The apparatus of claim 1, wherein the mapping assistance information comprises a mapping tile of said geographical region.

3. The apparatus of claim 1, wherein the geographical region includes an indoor region.

4. The apparatus of claim 1, wherein the location estimator is to communicate said request for mapping assistance information and the response with said server according to an assisted global-positioning-system (GPS) protocol.

5. The apparatus of claim 1, wherein the location estimator is to communicate said request for mapping assistance information and the response with said server according to a Long Term Evolution (LTE) Positioning Protocol (LPP) or an LPP extension (LPPe).

6. The apparatus of claim 5, wherein said location estimator is to include said request for mapping assistance information in a field of a LPPe-RequestAssistanceData message, and to receive said response in a field of a LPPe-RequestAssistanceData message.

7. The apparatus of claim 1, wherein the location estimator is to communicate said request for mapping assistance information and the response with said server according to a Secure User Plane Location (SUPL) protocol.

8. The apparatus of claim 1, wherein the location estimator is to receive the mapping assistance information based on user-credentials of a user of said mobile device.

9. The apparatus of claim 8, wherein the user-credentials comprise an identifier selected from the group consisting of a cellular identifier of a cellular mobile device and a Secure User Plane Location (SUPL) based user identifier.

10. The apparatus of claim 8, wherein the mapping assistance information comprises restricted mapping information of a restricted region, and wherein the restricted mapping information is based on the user-credentials of the user of said mobile device.

11. The apparatus of claim 1, wherein the location assistance information comprises assisted global-positioning-system (A-GPS) data to assist the location estimator in determining the estimated location of said mobile device.

12. The apparatus of claim 11, wherein said A-GPS data comprises data to assist the location estimator in improving at least one of an accuracy or a time of determining the estimated location of said mobile device.

13. A system comprising:
   a server including:
      a communication interface to communicate with a mobile device; and
      a database to store location assistance information and mapping information of one or more geographical regions,
      wherein said server is to receive from the mobile device a request to establish a secure assistance session for reception of requested location assistance information from the server, the server is to send to said mobile device the requested location assistance information configured to assist said mobile device to determine an estimated location of the mobile device, said server is configured to receive from the mobile device, during the secure assistance session and after sending said location assistance information, a request for requested mapping assistance information, the request for requested mapping assistance information including one or more parameters defining a requested geographical region based on said estimated location, and one or more fields defining one or more requested attributes of the requested mapping assistance information, the one or more requested attributes including at least a requested type of the mapping information, the requested mapping assistance information to assist the mobile device to correct the estimated location of the mobile device, which is to be determined based on the location assistance information, said server is configured to, during the secure assistance session, send to said mobile device a response including the requested mapping assistance information according to said one or more parameters and according to the one or more requested attributes.

14. The system of claim 13, wherein the requested mapping assistance information comprises a mapping tile of said geographical region.

15. The system of claim 13, wherein the server is to send the requested mapping assistance information based on user-credentials of a user of said mobile device.

16. The system of claim 13, wherein the requested location assistance information comprises assisted global-positioning-system (A-GPS) data corresponding to one or more GPS satellites.

17. The system of claim 13, wherein the requested location assistance information comprises assisted global-positioning-system (A-GPS) data to assist the location estimator in determining the estimated location of said mobile device.

18. A product including a non-transitory storage medium having stored thereon instructions that, when executed by a machine, result in:
storing location assistance information and mapping information of one or more geographical regions;
receiving from a mobile device a request to establish a secure assistance session for providing to the mobile device requested location assistance information;
sending to the mobile device the requested location assistance information configured to assist said mobile device in determination of an estimated location of the mobile device;
during said secure assistance session and after sending said requested location assistance information, receiving from the mobile device a request for requested mapping assistance information, the request for requested mapping assistance information including one or more parameters defining a requested geographical region based on said estimated location, and one or more fields defining one or more requested attributes of the requested mapping assistance information, the one or more requested attributes including at least a requested type of the mapping information, the requested mapping assistance information to assist the mobile device to correct the estimated location of the mobile device, which is to be determined based on the location assistance information; and
during said secure assistance session, sending to said mobile device a response including the requested mapping assistance information according to said one or more parameters and according to the one or more requested attributes.

19. The product of claim 18, wherein the instructions result in communicating said request for requested mapping assistance information and the response with said mobile device according to a Long Term Evolution (LTE) Positioning Protocol (LPP) or an LPP extension (LPPe).

20. The product of claim 18, wherein the instructions result in communicating said request for requested mapping assistance information and the response with said mobile device according to a Secure User Plane Location (SUPL) protocol.

21. The product of claim 18, wherein the instructions result in sending the requested mapping assistance information based on user-credentials of a user of said mobile device.

22. A product including a non-transitory storage medium having stored thereon instructions that, when executed by a machine, result in:
sending from a mobile device a request to a server to establish a secure assistance session for reception of location assistance information from the server;
receiving at the mobile device the location assistance information from the server;
determining an estimated location of said mobile device using the location assistance information;
during the secure assistance session, sending to said server a request for mapping assistance information, the request for mapping assistance information including one or more parameters defining a geographical region based on said estimated location, and one or more fields defining one or more requested attributes of the mapping assistance information, the one or more requested attributes including at least a requested type of the mapping information;
during the secure assistance session, receiving from said server a response including the mapping assistance information according to said parameters and according to the one or more requested attributes;
mapping the estimated location of the mobile device to the geographical region based on the mapping assistance information, and
based on the mapping assistance information, correcting the estimated location of the mobile device, which is determined based on the location assistance information.

23. The product of claim 22, wherein the mapping assistance information comprises a mapping tile of said geographical region.

24. The product of claim 22, wherein the instructions result in receiving the mapping assistance information based on user-credentials of a user of said mobile device.

\* \* \* \* \*

UNITED STATES PATENT AND TRADEMARK OFFICE
CERTIFICATE OF CORRECTION

PATENT NO.       : 9,661,452 B2
APPLICATION NO.  : 14/134956
DATED            : May 23, 2017
INVENTOR(S)      : Itai Steiner It is certified that error appears in the above-identified patent and that said Letters Patent is hereby corrected as shown below:

In the Claims

In Column 27, Line 57, in Claim 1, delete "mapping, assistance information," and insert -- mapping assistance information, --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*